(12) United States Patent
Chittigala et al.

(10) Patent No.: US 9,110,717 B2
(45) Date of Patent: Aug. 18, 2015

(54) MANAGING USE OF LEASE RESOURCES ALLOCATED ON FALLOVER IN A HIGH AVAILABILITY COMPUTING ENVIRONMENT

(75) Inventors: Jes Kiran Chittigala, Kukatpally (IN); Ravi A. Shankar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 13/542,639

(22) Filed: Jul. 5, 2012

(65) Prior Publication Data

US 2014/0013153 A1     Jan. 9, 2014

(51) Int. Cl.
G06F 11/00     (2006.01)
G06F 9/50      (2006.01)
G06F 11/20     (2006.01)

(52) U.S. Cl.
CPC .............. *G06F 9/50* (2013.01); *G06F 9/5022* (2013.01); *G06F 11/203* (2013.01); *G06F 11/2041* (2013.01); *G06F 11/2046* (2013.01)

(58) Field of Classification Search
CPC ....... G06F 9/50; G06F 9/5005; G06F 9/5011; G06F 9/5016; G06F 9/5022; G06F 9/5027; G06F 9/5044; G06F 9/505; G06F 9/5061; G06F 9/5066; G06F 9/5077; G06F 9/5083; G06F 9/5088
See application file for complete search history.

(56) References Cited

U.S. PATENT DOCUMENTS

| | | |
|---|---|---|
| 5,889,989 A | 3/1999 | Robertazzi et al. |
| 6,567,839 B1 | 5/2003 | Borkenhagen et al. |
| 7,571,307 B2 | 8/2009 | Duron et al. |
| 7,865,757 B2 | 1/2011 | Borkenhagen et al. |
| 2005/0004879 A1 | 1/2005 | Mathias et al. |
| 2005/0066032 A1 | 3/2005 | Birkestrand et al. |
| 2005/0137973 A1 | 6/2005 | Hoffman et al. |
| 2009/0119508 A1 | 5/2009 | Lewis et al. |
| 2009/0235265 A1* | 9/2009 | Dawson et al. ............... 718/104 |
| 2013/0159998 A1* | 6/2013 | Cawlfield et al. ................. 718/1 |
| 2013/0262556 A1* | 10/2013 | Xu et al. ....................... 709/202 |

OTHER PUBLICATIONS

U.S. Appl. No. 13/552,570, filed Jul. 18, 2012, In re Chittigala, International Business Machines Corporation, 41 pages.

(Continued)

*Primary Examiner* — Michael Maskulinski
(74) *Attorney, Agent, or Firm* — Damion Josephs; Amy J. Pattillo

(57) ABSTRACT

Responsive to a cluster manager for a particular node from among multiple nodes allocating at least one leased resource for a resource group for an application workload on the particular node, on fallover of the resource group from another node to the particular node, setting a timer thread, by the cluster manager for the particular node, to track an amount of time remaining for an initial lease period of the at least one leased resource. Responsive to the timer thread expiring while the resource group is holding the at least one leased resource, maintaining, by the cluster manager for the particular node, the resource group comprising the at least one leased resource for an additional lease period and automatically incurring an additional fee, only if the particular node has the capacity to handle the resource group at a lowest cost from among the nodes.

12 Claims, 7 Drawing Sheets

(56) References Cited

OTHER PUBLICATIONS

Final Office Action, U.S. Appl. No. 13/552,570, filed Jul. 18, 2012, In re Chittigala, International Business Marchines Corporation, mailing date Oct. 11, 2013, 10 pages.

Administering PowerHA System Mirror, PowerHA SystemMirror Version 7.1 for AIX Standard Edition, available online at http://pic.dhe.ibm.com/infocenter/aix/v7r1/topic/com.ibm.aix.powerha.admngd/hacmpadmngd_pdf.pdf, copyright 2010, 2012, International Business Machines Corporation, p. 398, 452 pages.

Quintero et al, IBM PowerHA SystemMirror 7.1 for AIX, available online at http://www.redbooks.ibm.com/redbooks/pdfs/sg247845.pdf, Mar. 2011, International Business Machines Corporation, 556 pages.

Office Action, U.S. Appl. No. 13/552,570, filed Jul. 18, 2012, In re Chittigala, International Business Machines Corporation, mailing date Mar. 18, 2013, 18 pages.

Office Action, U.S. Appl. No. 13/552,570, filed Jul. 18, 2012, In re Chittigala, International Business Machines Corporation, mailing date Aug. 7, 2014, 15 pages.

Office Action, U.S. Appl. No. 13/552,570, filed Jul. 18, 2012, In re Chittigala, International Business Machines Corporation, mailing date Jun. 26, 2015, 26 pages.

\* cited by examiner

MANAGING USE OF LEASE RESOURCES ALLOCATED ON FALLOVER IN A HIGH AVAILABILITY COMPUTING ENVIRONMENT

BACKGROUND

1. Technical Field

The embodiment of the invention relates generally to managing use of lease resources allocated on fallover in a high availability computing environment.

2. Description of Related Art

In some computing environments, it is important that the computing environment continue to handle application workloads even if one or more resources handling the application workloads within the computing environment, fail. For a computing environment to continue to handle application workloads, even if one or more resources handling the application workloads within the computing environment fail, the computing environment may implement redundant computers in groups or clusters and implement a high availability controller that provides for automated continued service to application workloads when system components within the computing environment fail. In one example, application workloads require one or more applications running on one or more resources in a resource group. To provide high availability for applications needed for application workloads, when system components fail or other conditions in the cluster change, the high availability (HA) controller detects when the conditions in the cluster change, and moves the resource group for the workload to a standby node. Moving the resource group for the workload to a standby node includes configuring the resources required for the resource group on the standby node and starting the applications for the workload on the resource group on the standby node.

For an HA controller to start applications on a standby node, the HA controller determines whether the standby node needs additional processor, memory, and other hardware resources for the resource group to handle the applications and configures the resource group on the standby node with the required resources before starting the application on the standby node. In some computing environments, the HA controller can dynamically add physical and logical resources to a standby node, such as by dynamically allocating CPUs and memory to a logical partition on a node, to increase the hardware resources available for handling application workloads moved over to the standby node.

In some computing systems, the resources that can be dynamically allocated to a standby node include on demand, lease resources, such as IBM®'s Capacity Upgrade on Demand (CUoD) resources (IBM is a trademark of International Business Machines Corporation). CUoD resources are hardware resources that are preinstalled into a server to provide additional capacity, such as additional CPU and memory, but are not active until a client decides to enable the CUoD resources by acquiring a license to activate the CUoD resources, from a service provider, for a lease period for a fee. The high availability controller or a user determines when to activate lease resources, such as for increasing the resources available to a standby node to handle a fallover of an application for a workload from a primary node.

BRIEF SUMMARY

When a HA controller is required to allocate lease resources for a standby node to move a resource group from a first node to a standby node when conditions change within the cluster, to provide sufficient resources for the resource group, the standby node only has sufficient resources for the resource group if the lease resources are held in the resource group until the application workload on the resource group is completed. If the applications continue on the standby node even after the initial lease period for the lease resources concludes, an additional fee is automatically incurred for the resource group holding the lease resources after the initial lease period expires. In view of the foregoing, there is a need for a method, computer system, and computer program product for the HA controller to continuously monitor, after lease resources are allocated to a resource group moved to a standby node, whether the resource group has released the lease resources and the amount of time remaining in an initial lease period for lease resources, and to determine, when the initial lease period expires, whether to move the resource group to another node or maintain the resource group on the node and holding the lease resources for an additional lease period.

An embodiment of the invention provides a computer system for managing lease resources. The computer system comprises a cluster manager, coupled to at least one processor and memory, for a particular node from among a plurality of nodes communicatively connected through a network. The cluster manager is programmed, responsive to the cluster manager allocating at least one leased resource for a resource group for an application workload on the particular node on fallover of the resource group from another node from among the plurality of nodes to the particular node, to set a timer thread to track an amount of time remaining for an initial lease period of the at least one leased resource. The cluster manager is programmed, responsive to the timer thread expiring while the resource group is holding the at least one leased resource, to maintain the resource group comprising the at least one leased resource for an additional lease period and automatically incur an additional fee for use of the at least one leased resource by the particular node only if the particular node has the capacity to handle the resource group at a lowest cost from among the plurality of nodes.

In another embodiment, a computer program product is provided for managing resources. The computer program product comprises a non-transitory computer readable storage medium having program instructions embodied therewith. The program instructions are executable by a computer to cause the computer to, responsive to a cluster manager for a particular node from among a plurality of nodes communicatively connected through a network, allocating at least one leased resource for a resource group for an application workload on the particular node on fallover of the resource group from another node from among the plurality of nodes to the particular node, a timer thread to track an amount of time remaining for an initial lease period of the at least one leased resource. The program instructions are executable by a computer to cause the computer to, responsive to the timer thread expiring while the resource group is holding the at least one leased resource, maintain the resource group comprising the at least one leased resource for an additional lease period and automatically incur, by the cluster manager for the particular node, an additional fee, only if the particular node has the capacity to handle the resource group at a lowest cost from among the plurality of nodes.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
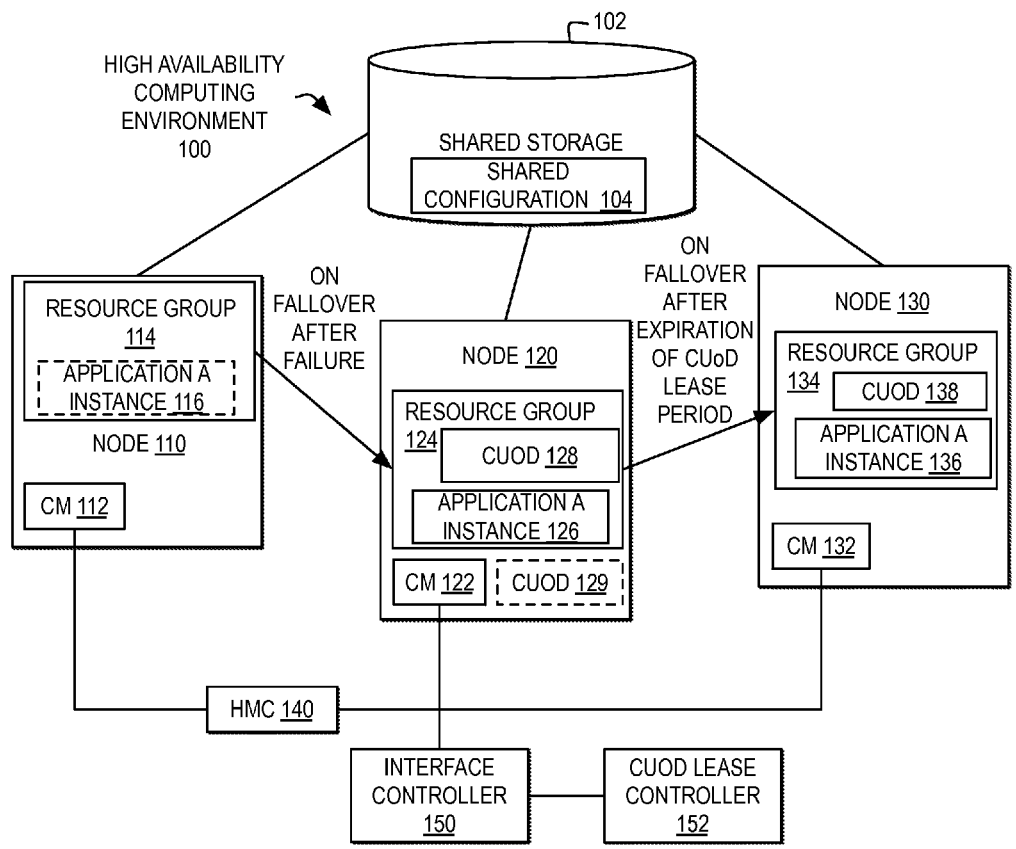
FIG. 1 illustrates a block diagram of one example of one embodiment of a high availability (HA) computing environment in which a high availability controller manages resource group fallover, where at least one machine within the HA computing environment activates lease resources for facilitating high availability for applications on resource group fallover.

FIG. 1 illustrates a block diagram of one example of one embodiment of a high availability (HA) computing environment in which a high availability controller manages resource group fallover, where at least one machine within the HA computing environment activates lease resources for facilitating high availability for applications on resource group fallover.

In the example, a high availability (HA) computing environment 100 represents a computing environment in which multiple computing systems communicate with one another and interact to handle workloads, jobs, or other computational tasks via one or more network connections. In one example, while HA computing environment 100 includes multiple computing systems, computing environment 100 may be view as a single system.

In one example, HA computing environment 100 includes one or more computing systems, viewed as multiple nodes, illustrated as a node 110, a node 120, and a node 130, in a cluster, such as a PowerHA® SystemMirror® cluster. In one example, each of node 110, node 120, and node 130 is a processor that runs an operating system, a cluster manager, and one or more applications for handling workloads and each node may own a set of resources, including, but not limited to, disks, volume groups, file systems, networks, network addresses, and applications. Each of node 110, node 120, and node 130 may include a separate physical system, a separate logical system, or a separate virtualized system, each of which may include one or more of one or more server systems, machines, or frames, the resources of each of which may be partitioned into one or more logical partitions. In one example, HA computing environment 100 may include multiple System p® servers divided into logical partitions, RS/6000®, System i®, Blades, or System p® standalone systems, or a combination of these systems. Each of node 110, node 120, and node 130 may be connected through one or more network connections that enable each node to communicate, directly or indirectly, with at least one other node, including, but not limited to local area networks, wide area networks, wireless networks, and wired networks. One of ordinary skill in the art will appreciate that HA computing environment 100 may by implemented using multiples types of distributed computing environments.

In one example, each of node 110, node 120, and node 130 share one or more sets of resources, including shared storage 120, which may include one or more disks. In one example, shared storage 120 may include shared configuration data 104 that includes one or more types of configuration information including, but not limited to, the hardware configuration and capacity of each node in HA computing environment 100, and resource requirements for configuration information for each application, each resource group, and other workload components implemented within HA computing environment 100.

In the example, each of node 110, node 120, and node 130 may access shared configuration data 104 and act as the central manager or primary node for HA computing environment 100 to determine the capacity of the nodes within HA computing environment 100 to handle workloads, to handle changing conditions in HA computing environment 100, and to manage distribution of workloads within HA computing environment. In another example, in HA computing environment 100 a machine separate from node 110, node 120, and node 130 may operate as the central manager. In one example, one or more of node 110, node 120, and node 130 may also communicate with an interface controller 150, where interface controller 150 provides an interface through which a client, or client layer, may specify configurations of each of node 110, node 120, and node 130 and specify configuration data 104, and through which each of node 110, node 120, and node 130 may send messages to the client.

In the embodiment, HA computing environment 100 provides high availability for application workloads, when the conditions in HA computing environment 100 change, by providing automated failover of resources groups running application workloads, from one node to another node within HA computing environment 100. Examples of conditions in HA computing environment 100 changing include, but are not limited to, when a resource of a node running a resource group with an application workload fails and when a node triggers a failover of a resource group when an initial lease period expires for activated, lease resources held by the resource group.

In one example, HA computing environment 100 automates the process of ensuring the high availability of applications within HA computing environment 100 through a high availability controller implemented within HA computing environment 100, such as Power HA System Mirror software, through a cluster manager (CM) application instance running on each node within HA computing environment 100. In the example illustrated, the high availability controller is implemented through CM 112 on node 110, CM 122 on node 120, and CM 132 on node 130. Each of CM 112, CM 122, and CM 132 may use shared storage 102 to facilitate efficient movement of resource groups from one node to another node and to access shared configuration information 104. In another example, a system separate from the nodes may provide the high availability controller for managing failover. In other embodiments, HA computing environment 100 may include additional or alternate nodes and configurations of nodes.

CM 112, CM 122, and CM 132 may detect failures have occurred from one or more messages including, but not limited to, an error message from another CM, an error message in shared configuration 104, or a CM not outputting a heartbeat. In addition, in one example, node 110, node 120, and node 130 may be connected to one or more hardware management consoles (HMCs), such as HMC 140, where HMC 140 represents a controller that controls the physical allocation of hardware resources within HA computing environment 100, detects when hardware errors occur within HA computing environment 100, and sends messages to CM 112, CM 122, and CM 132 with error information, such as when a machine within HA computing environment 100 is not responding to heartbeat requests. In other embodiments, HA computing environment 100 may include additional or alternate controllers for detecting errors and passing error messages within HA computing environment 100. In the example, shared configuration information 104 may specify a priority or policy for each CM to use to determine how the CM should handle failure messages.

In particular, each of CM 112, CM 122, and CM 132 may dynamically allocate resources to a resource group on node 110, node 120, and node 130, respectively. In one example, dynamic allocation of resources to a resource group on a node includes dynamically allocating resources to a dynamic logical partition for a resource group on a node. In one example, applications fallover from one node to another node by allocating each resource group within one or more logical partitions on one node and dynamically moving one or more logical partitions, with the resource group requirements, from one node to another node. In one example, when the one or more logical partitions are moved from one node to another node, the resources required for the resource group are dynamically allocated to the logical partition on the new node and an instance of the application is restarted on the resource group in the logical partition. Resources dynamically allocated to the logical partition on the new node may include resources allocated from a free pool, where the free pool includes permanent resources for a node that can be dynamically allocated through HMC 140 to a logical partition, and may include resources allocated from a CUoD pool, where the CUoD pool represents the CUoD resources that can be allocated once a license has been acquired to activate the CUoD resources for a lease period.

In particular, dynamic allocation of resources to a resource group on a node may include dynamically allocating lease resources to a dynamic logical partition for a resource group on a node. In one example, lease resources, such as CUoD resources, are resources pre-installed on one or more machines that are inactive and not allocable, until the lease resources are activated for a lease period, in exchange for a fee. In the example, a CM activating lease resources acquires a license from a CUoD lease controller 152, for example, where the license specifies a fee for use of the lease resources for an initial lease period and also specifies that if lease resources are not released prior to the expiration of the initial lease period, that the lessee automatically incurs an additional fee, for an additional lease period. In particular, in the example, under the license, when an initial lease period for a leased resource expires, the leased resource does not automatically change from an active state to an inactive state. The client acquiring the license to activate the lease resource must release the lease resource, and may also be required to reset the lease resource to an inactive state, to end the license period. In the example, CM 122 activates CUoD resources 128 on failover but does not activate CUoD resources 129. In addition, in the example, CM 132 activates CUoD resources 138. In one example, CM 122 and CM 132, through HMC 140, manages activations of CUoD resources using acquired CUoD licenses and manages deactivations of CUoD resources once the resources are released from resource group 124.

In one example, in HA computing environment 100, resource groups are placed on a node at startup, failover or fallback. Startup is the activation of a resource group on a node or multiple nodes. Resource group startup occurs during cluster startup or initial acquisition of the resource group on a node. Failover is the movement of a resource group from the node that currently owns the resource group to another active node after the conditions on the node that currently owns the resource group change, such as the current node experiencing a failure. Fallback is the movement of a resource group from the node on which it currently resides to a node that is joining or reintegrating into the cluster based on a criteria.

In the example illustrated, at startup, a resource group 114 is started on node 110, including an allocation of a minimum number of resources required for the applications for resource group 114 and at least one instance of an application started on resource group 114, illustrated as application A instance 116. In the example, shared configuration information 104 may specify the minimum resource requirements for each application. In the example, node 110 may include sufficient resources to handle the resource requirements for the application workload for the duration of the workload.

In the example illustrated, node 110 fails, CM 122 detects the failure and initiates a failover of resource group 114 by moving resource group 114 to node 120, as resource group 124. Moving resource group 114 to node 120, as resource group 124 includes CM 122 configuring resources for resource group 124 to allocate the minimum number of resources required for the applications for resource group 124 and restarting the applications on resource group 124, illustrated as application A instance 126. In the example, CM 122 activates CUoD resources 128 and allocates CUoD resources 128 to resource group 124. In the example where a resource group is moved to another node on fallover, and lease resources are activated and allocated to the resource group, such as CUoD resources 128, while the resource group on fallover initially starts with sufficient resources to handle application requirements, once the initial lease period for the CUoD resources expires, unless the resource group is moved to another node at the expiration of the initial lease period, if the resource group is still holding the lease resources, an additional cost is automatically incurred for the resource group to have sufficient resources to handle the application for an additional lease period. In the example, to avoid incurring additional costs at the expiration of the initial lease period, CM 122 sets a timer thread to count the time remaining on the initial lease period for CUoD resources 128 and CM 122 monitors whether resource group 124 releases CUoD resources 128. When the timer thread expires, if resource group 124 is still holding CUoD resources 128, CM 122 determines whether any other node has the capacity to handle the resource group at a lower cost than node 120.

In the example, at the expiration of the CUoD lease period, CM 122 decides to move resource group 124 to node 130, because CUoD resources 138 are available for allocation and include additional time on the initial lease period, therefore, node 130 can handle resource group 124 at a lower cost than node 120. CM 122 initiates a fallover of resource group 124 to node 130, as resource group 134. Moving resource group 124 to node 130 as resource group 134 includes CM 132 configuring resources for resource group 124 to allocate the minimum number of resources required for the applications for resource group 124 and restarting the applications on resource group 124, illustrated as application A instance 126. In one example, node 130 may include CUoD resources 138 with additional lease time remaining on the initial lease period because CUoD resources 138 were activated for a fallover, but the application workload using CUoD resources 138 completes before the end of the initial lease period and CUoD resources 138 are released to a free pool to be dynamically allocated to other resource groups or to be deactivated at the expiration of the initial lease period. When CM 132 allocates CUoD resources 138 to resource group 134, CM 132 sets a timer thread to count the time remaining on the initial lease period for CUoD resources 138 and CM 132 monitors whether resource group 134 releases CUoD resources 138. When the timer thread expires, if resource group 134 is still holding CUoD resources 138, CM 132 determines whether any other node has the capacity to handle the resource group at a lower cost than node 130.

In particular, in one example, by configuring node 120 and node 130 as standby nodes with permanent, paid for resources limited to a minimum number of resources to run CM 122 and CM 132, respectively, but also including access to additional allocable resources from lease resources, node 120 and node 130 only use additional resources when necessary to provide high availability to applications on fallover. A resource group running on a node will, however, hold lease resources as long as an application workload is running on the resource group, regardless of the length of the initial lease period for the lease resources. In addition, the license for a lease resource specifies that additional fees will be incurred if the lease resources are not released by the expiration of the initial lease period. Therefore, the CM allocating lease resources to resource groups when resource groups fallover to a node, needs to continuously monitor whether a resource group has released a lease resource, track the time remaining on the lease period and determine whether to move a resource group holding a leased resource to another node to reduce costs, when the initial lease period expires. The CM queries other nodes to determine whether other nodes have sufficient permanent resources to handle the resource group and whether other nodes have allocable lease resources with time remaining on an initial lease period.

In particular, in the example, once CUoD resources 128 are activated and allocated to resource group 124 on node 120 by HMC 140, CUoD resources 128 are allocated to the one or more logical partitions for resource group 124 until the requirements of application A instance 126 are met or until application A is moved to another resource group on node 120 or on another node. In particular, when application A instance 126 no longer requires CUoD resources 128, resource group 124 returns CUoD resources 128 to a free pool and CM 122 may request to deactivate CUoD resources 128. In one example, CM 122 deactivates CUoD resources 128 by directing HMC 140 to return CUoD resources 128 to an inactive state and returning a deactivation confirmation message to CUoD lease controller 152 indicating the CUoD resources have been returned to an inactive state.

Because CUoD resources 128 will be held by resource group 124 until application A instance 126 no longer needs the resources, CUoD resources 128 may be held by resource group 124 after the initial lease period specified in the CUoD license, expires, incurring additional fees for the continued use of the CUoD resources, according to the terms of the CUoD license. To minimize the costs associated with activation of CUoD resources on failover, when CUoD resources are allocated to a resource group on failover, CM 122 triggers a timer thread, set to the time remaining for the lease period for the CUoD resources. CM 122 continues to monitor the status of use of the CUoD resources and cancels the timer thread when the CUoD resources are released. If the timer thread count expires, CM 122 determines whether there are other nodes, including other resource groups on the node, that can handle the workload at a lower cost than resource group 124, incurring additional fees for use of CUoD resources 128 after the initial lease period. If CM 122 determines there are other nodes or other resource groups on the node that can handle the workload at a lower cost than resource group 124, CM 122 manages movement of the workload to another node. If CM 122 maintains the workload on node 120 and continues to hold CUoD resources 128, CM 122 triggers a message for output via interface controller 150, indicating that an additional fee has been incurred for use of CUoD resources 128 after the initial lease period has expired.

Figure 2:
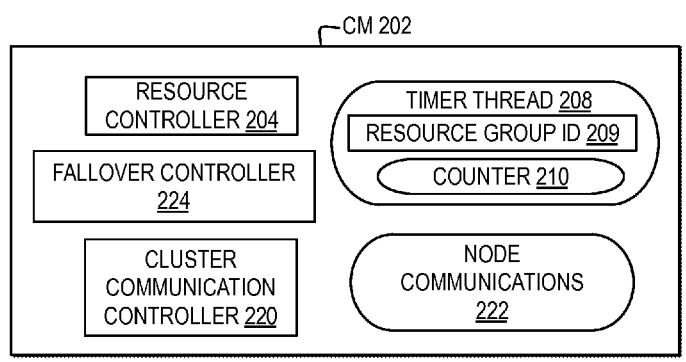
FIG. 2 illustrates a block diagram of one example of a cluster manager on a node within a HA computing environment.

FIG. 2 illustrates a block diagram of one example of a cluster manager on a node within a HA computing environment. In the example, CM 202, implemented on a node, such as CM 112, CM 122, or CM 132, includes a resource controller 204 for interfacing with an HMC and controlling resource allocations, including dynamic resource allocations to a dynamic logical partition and migration of dynamic logical partitions. In the example, CM 202 includes a cluster communication controller 220 for controlling communications with other nodes and components within HA computing environment 100. Although not depicted, CM 202 may include one or more of a hypervisor or other middleware virtualization layer or may communicate with a hypervisor or other middleware virtualization layer, for managing logical partitions and other groupings of virtualized resources.

In the example, CM 202 includes a fallover controller 224 for monitoring for errors in HA computing environment 100 and managing fallover of a resource group to a node, and a CUoD timer manager 206 for controlling a timer for monitoring for the expiration of a lease period for CUoD resources allocated on fallover of a resource group, and still held by the resource group. In the example, fallover controller 224 may detect an error message from another node or from HMC 140, indicating a failure requiring fallover of a resource group. Fallover controller 224 controls fallover of the resource group to the node, including, but not limited to, controlling allocation of resources to logical partition for the resource group and restarting the application for the application workloads on the resource group. Allocation of resources to a logical partition for the resource group may include fallover controller 224 requesting activation of CUoD resources, to have sufficient resources to allocate to the resource group for the application.

In the example, on fallover of a resource group requiring an allocation of CUoD resources, fallover controller 224 triggers a timer thread 208. Timer thread 208 includes a resource group ID 209 of the resource group holding the allocated CUoD resources and a counter 210 set to count an adjusted lease period. Fallover controller 224 monitors for a change in the status of the allocated CUoD resources. If resource controller 204 indicates the CUoD resources are released, such as by being returned to a free pool or deactivated, fallover controller 224 cancels timer thread 208. If counter 210 on timer thread 208 expires, indicating that the lease period for the held CUoD resources is about to expire, timer thread 208 sends a message to fallover controller 224 indicating the timer has expired. Fallover controller 224 receives expired timer messages and, in response, determines whether there are other nodes with the capability to handle the resource group. In one example, fallover controller 224 accesses shared configuration 104 to determine whether there are other nodes configured with sufficient resources to handle the resource group. If fallover controller 224 determines there are other nodes configured with sufficient resources to handle the resource group, fallover controller 224 triggers a protocol to send capacity requests through cluster communication controller 220 to the live nodes, and records the outgoing request in node communications 222. Cluster communication controller 220 gathers responses to the capacity request in node communications 222. Fallover controller 224 analyzes the capacity responses for the capacity request, gathered in node communications 222, and determines whether there is another node with the capacity to handle the resource group at a lower cost than the cost associated with the current node handling the resource group. If fallover controller 224 determines there is another node with the capacity to handle the resource group at a lower cost than the cost associated with the current node handling the resource group, fallover controller 224 initiates movement of the resource group to the selected node. If fallover controller 224 does not identify another node, and maintains the resource group with the CUoD resources, fallover controller 224 initiates a message to a client indicating that additional fees are being incurred for use of the CUoD resources after the lease period expires.

Figure 3:
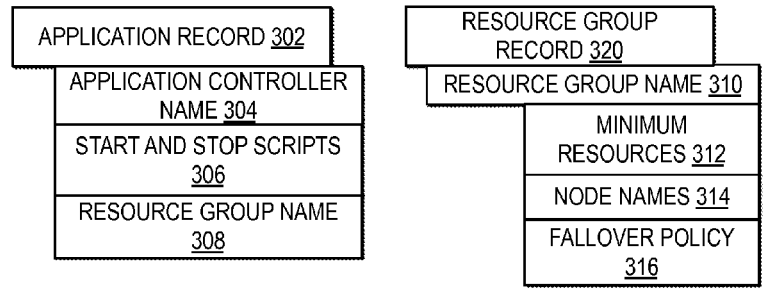
FIG. 3 illustrates a block diagram of one example of data structures for identifying application and resource group requirements in an HA computing environment.

FIG. 3 illustrates a block diagram of one example of data structures for identifying application and resource group requirements in an HA computing environment. In the example, each of CM 112, CM 122, and CM 132 may store a local copy of each of an application record 302 and a resource group record 320 and reference each of application record 302 and resource group record 320 on fallover of a resource group. In the example, application record 302 identifies an application controller name 304, with the name of an application, start and stop scripts 306 for starting and stopping an application, and a resource group name 308, for identifying the resource group for the application. In the example, resource group record 320 includes a resource group name 310 for identifying the resource group, a minimum resource requirement 312 identifying the minimum resource requirements for the resource group, node names 314 identifying the nodes that can run the resource group, and a fallover policy 316 identifying whether the resource group is permitted to fallover to another node. In the example, for fallover controller 224 to determine whether to fallover a resource group to another node and if so, which node to use on fallover of a resource group, the CM looks up resource group record 320, to determine from node names 314, which nodes are available for fallover of the resource group, and to determine from fallover policy 316, a priority for selecting among the available nodes, and the minimum resource requirements for the resource group, from minimum resource 312. The node restarting an application on fallover references start and stop scripts 306 to start an application on the node and references start and stop scripts 306 to stop the application on the node when the application is complete.

Figure 4:
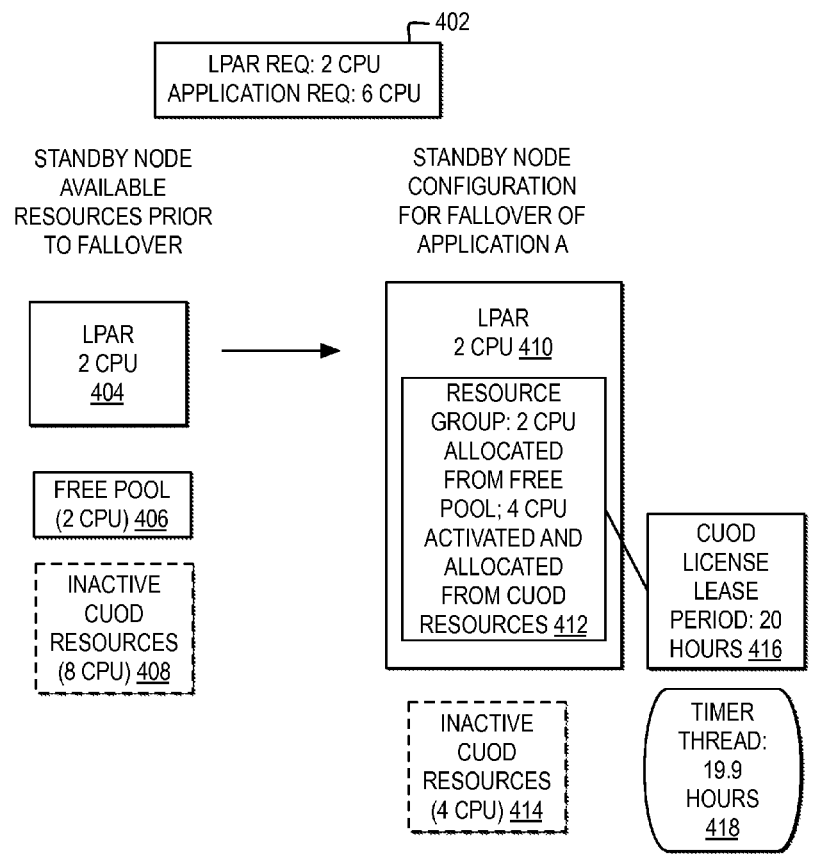
FIG. 4 illustrates a block diagram of one example of a standby node with CUoD resources activated and allocated to a resource group for an application workload on fallover.

FIG. 4 illustrates a block diagram of one example of a standby node with CUoD resources activated and allocated to a resource group for an application workload on fallover. In the example, a standby node, such as node 120, prior to fallover, includes an LPAR allocated with 2 CPU, as illustrated at reference numeral 404, a free pool of 2 CPU available for dynamic allocation to LPAR 404, and 8 CPU accessible as inactive CUoD resources 408, where inactive CUoD resources 408 require a CUoD license, acquired in exchange for a fee, for activation, prior to allocation. In the example, a resource group running application A needs to fallover to the standby node. As illustrated at reference numeral 402, the requirement for the LPAR is 2 CPU and the requirements for the resource group for the application is 6 CPU, therefore 8 CPU will need to be allocated to the LPAR to handle both the LPAR requirement and the resource group requirement. In the example, for fallover of the resource group, the standby node is configured, as illustrated at reference numeral 410, with the LPAR configured with the 2 CPU originally allocated to the LPAR and with a resource group 412 configured with 2 CPU allocated from free pool 406 and 4 CPU activated and allocated from CUoD resources 408. As illustrated at reference numeral 414, the inactivate CUoD resources are reduced from 8 CPUs to 4 CPUs, after the activation and allocation of 4 CPUs.

In the example, the CUoD license lease period is for 20 hours, as illustrated at reference numeral 416. In the example, the fallover controller for the node starts a timer thread 418 set to an adjusted lease period of 19.9 hours. In one example, the time set in a timer thread is an adjusted lease period time sufficient to allow for a determination whether to fallover the application to another node and deactivate the CUoD resources, at the end of the lease period.

Figure 5:
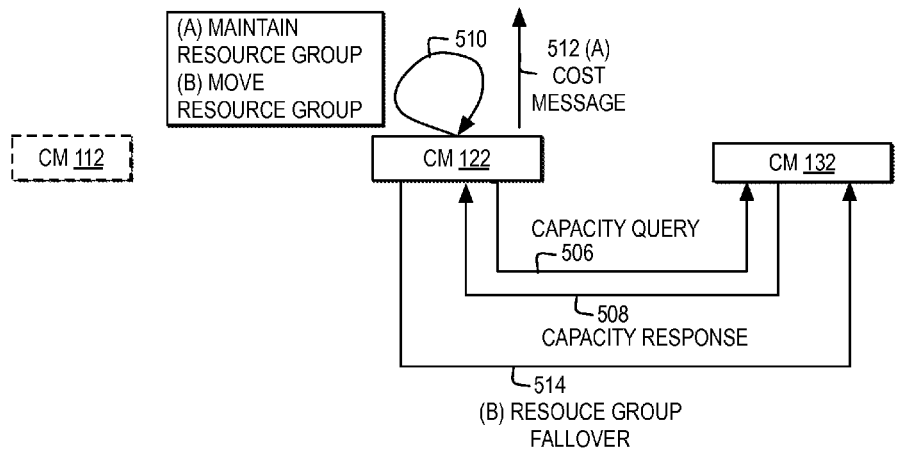
FIG. 5 illustrates a block diagram of one example of an HA controller managing an application within a HA computing environment when the lease period expires for CUoD resources allocated for to a resource group on fallover and still held by the resource group.

FIG. 5 illustrates one example of a block diagram of an HA controller managing an application within a HA computing environment when the lease period expires for CUoD resources allocated for to a resource group on fallover and still held by the resource group. In the example, CM 122 detects the expiration of a timer thread, such as the expiration of timer thread 418. CM 122 determines whether any other nodes have the capability to handle the resource group associated with the timer thread and if other nodes have the capability to handle the resource group, sends a capacity request to the CM for the other live nodes. In the example, CM 112 is on a node that failed and is still not live and CM 132 is on a node that is live. As illustrated at reference numeral 506, CM 122 sends a capacity query to CM 132. CM 132 responds with a capacity response, as illustrated at reference numeral 508. CM 122 collects capacity responses and, as illustrated at reference numeral 510, decides whether to (A) maintain the resource group on the node or to (B) move the resource group to another node. If CM 122 decides to maintain the resource group, CM 122 triggers a cost message for output to the client, as illustrated at reference numeral 512, indicating that additional fees are being incurred for use of the CUoD resources beyond the lease period per the CUoD license. If CM 122 decides to move the resource group, CM 122 triggers a fallover of the resource group to another node, as illustrated at reference numeral 514.

Figure 6:
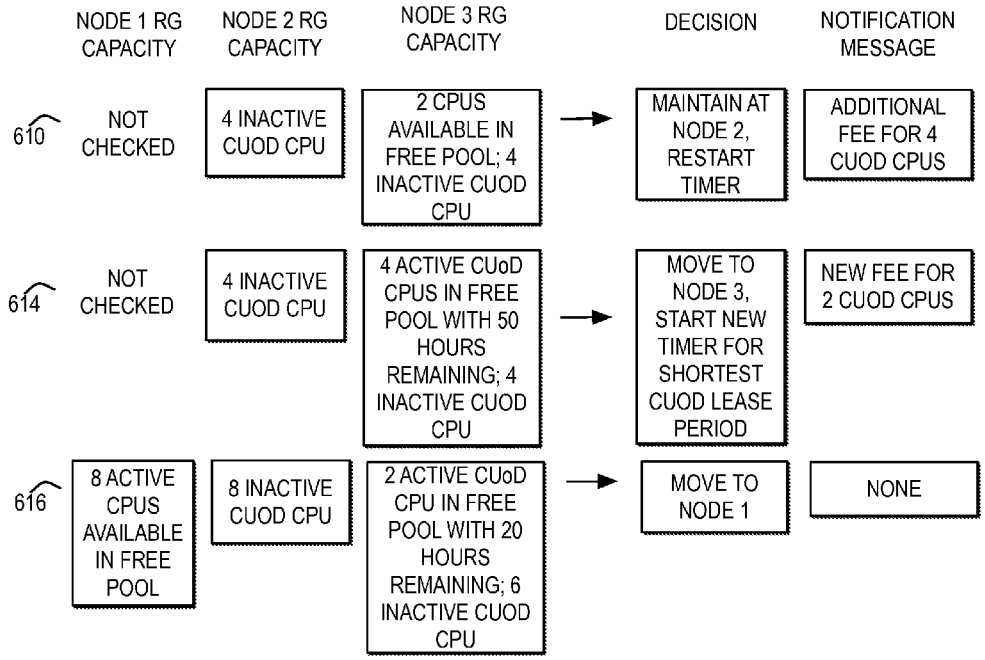
FIG. 6 illustrates a block diagram of one example of analyzed capacity responses and decisions by a fallover controller, in response to the expiration of a CUoD lease period for CUoD resources allocated on fallover of a resource group.

FIG. 6 illustrates one example of a block diagram of analyzed capacity responses and decisions by a fallover controller, in response to the expiration of a CUoD lease period for CUoD resources allocated on fallover of a resource group. In the example, an application is currently running on a resource group with 6 CPUs on node 2, such as resource group 412, illustrated in FIG. 4, which includes four CUoD CPUs activated and allocated at fallover and 2 additional CPUs allocated from a free pool. At reference numeral 610, the lease period for the four CUoD CPUs activated at fallover is about to expire, node 2 sends capacity requests to other nodes, and capacity responses illustrated, illustrate the resource capacity available on each node to allocate to a new resource group, where the resource group requires six CPUs. In the example, at reference numeral 610, the resource group (RG) capacity for node 1 is not determined because node 1 is still offline, the RG capacity for node 2 includes four inactive CUoD CPU, and the RG capacity for node 3 includes two CPUs available in a free pool and 4 inactive CUoD CPU. In the example, node 2 decides to maintain the resource group on node 2 and restart the timer thread for the CUoD resources for an additional lease period. In particular, in the example, maintaining the resource group on node 2 would require incurring additional fees for holding the four activated, expired CUoD resources in the resource group and moving the resource group to node 3 would require activating four CUoD resources on node 3, therefore, unless the fee for the four CUoD resources on node 3 is less than the fee for the CUoD resources on node 2, there would not be a cost benefit to moving the resource group to node 3 and activating four new CUoD resources. In one example, where no additional lease period is specified in the CUoD license, node 2 may automatically select a duration for an additional lease period. In addition, in the example, at reference numeral 610, a notification message is triggered identifying that an additional fee is incurred for the four CUoD CPUs.

In the example, at the next expiration of the timer on node 2, indicating the additional lease period for the CUoD resources on node 2 has expired again, as illustrated at reference numeral 614, node 2 receives capacity responses and determines whether to maintain the resource group at node 2 or move the resource group to another node. In the example, at reference numeral 614, the RG capacity for node 1 is not determined because node 1 is still offline, the RG capacity for node 2 includes four inactive CUoD CPU, and the RG capacity for node 3 includes four active CUoD CPUs available in a free pool with fifty hours remaining and four inactive CUoD CPU. In the example, node 2 decides to move the resource group to node 3 and a new timer is started on node 3. In particular, in the example, maintaining the resource group on node 2 would require incurring additional fees for holding the four activated, expired CUoD resources in the resource group and moving the resource group to node 3 would only require activating two CUoD resources, along with using the remaining time on the other CUoD resources already activated, therefore, it is more cost effective to move the resource group to node 3 and activate two CUoD resources, rather than maintain the resource group on node 2 and extend the lease on four CUoD resources. In the example, node 3 starts a timer thread with the shortest CUoD lease period set in the counter, which in the example is the 50 hours remaining on the four active CUoD CPUs allocated from the free pool. In one example, if multiple timers are set, a single thread or multiple threads may be used to monitor timer expirations. In addition, in the example, at reference numeral 614, a notification message is triggered identifying that a new fee is incurred for two CUoD CPUs on another node.

In the example, at the next expiration of the timer on node 3, indicating the additional lease period for the CUoD resources on node 3 has expired, as illustrated at reference numeral 616, node 3 receives capacity responses and determines whether to maintain the resource group at node 3 or move the resource group to another node. In the example, at reference numeral 616, the RG capacity for node 1 is eight CPUs available in the free pool, the RG capacity for node 2 is eight inactive CUoD CPUs, and the RG capacity for node 3 is two active CUoD CPU in the free pool with twenty hours remaining and six inactive CUoD CPUs. In the example, node 3 decides to move the resource group to node 1. In particular, in the example, maintaining the resource group on node 3 would require incurring additional fees for holding the four activated, expired CUoD resources in the resource group and moving the resource group to node 1 requires no CUoD resources. In the example, no additional notification message is triggered because no additional fees are incurred.

Figure 7:
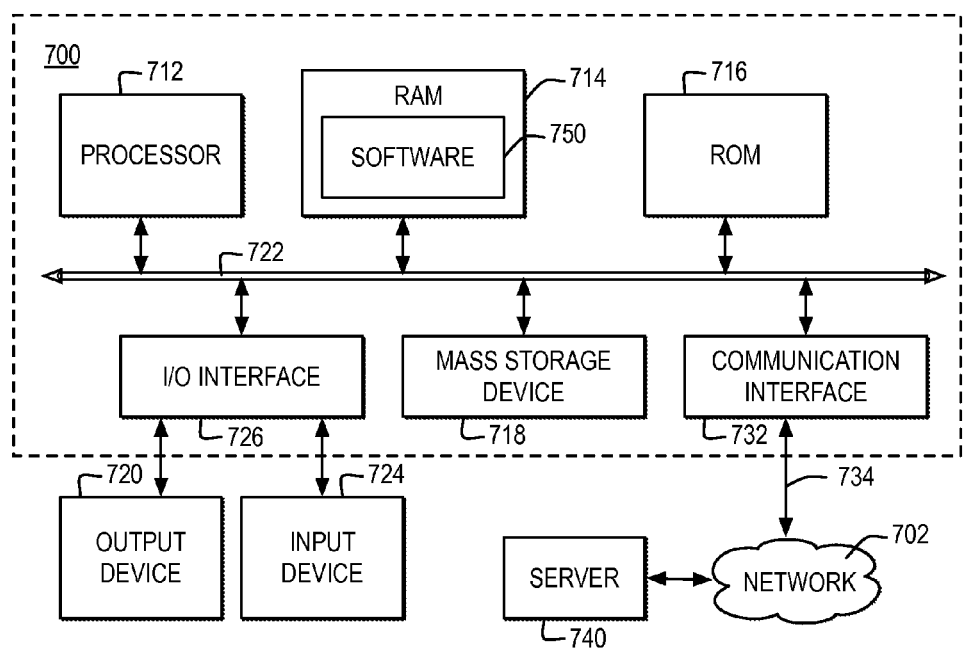
FIG. 7 illustrates one example of a schematic of a computer system in which the present invention may be implemented.

FIG. 7 illustrates one example of a schematic of a computer system in which the present invention may be implemented. The present invention may be performed in a variety of systems and combinations of systems, made up of functional components, such as the functional components described with reference to computer system 700 and may be communicatively connected to a network, such as network 702. In one example, each of node 110, node 120, node 130, HMC 140, interface controller 150, and CUoD lease controller 152 may each implement one or more instances of functional components of computer system 700. In another example, computer system 700 may represent one or more cloud computing nodes.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 722, additional controllers (not depicted) for managing bus access and locks may be implemented.

Processor 712 may be at least one general-purpose processor such as IBM® PowerPC® (IBM and PowerPC are registered trademarks of International Business Machines Corporation) processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a cluster system, and a grid environment.

Figure 8:
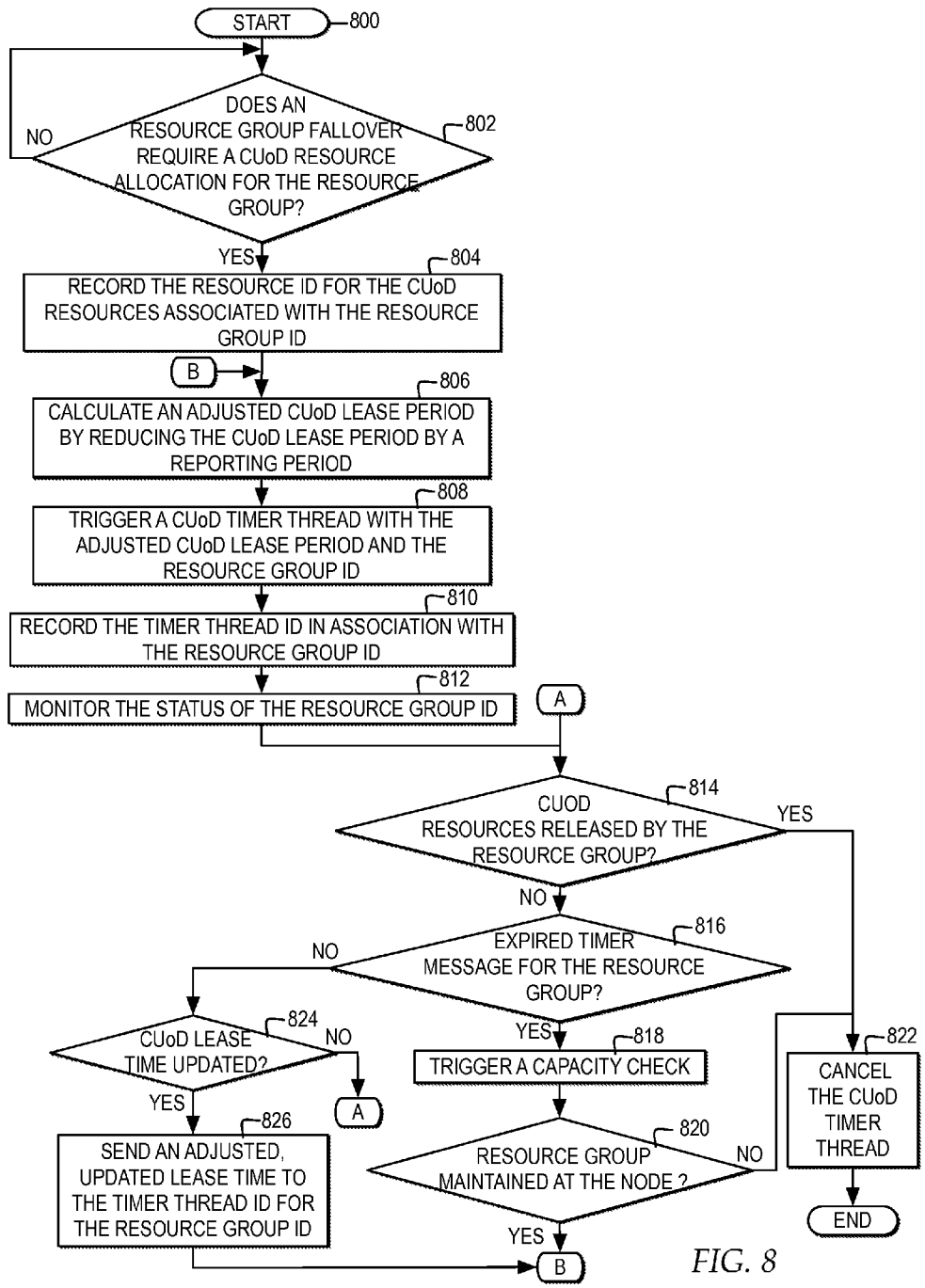
FIG. 8 illustrates a high level logic flowchart of a process and program for monitoring use of CUoD resources on fallover of a resource group for an application workload in a HA computing environment.
Figure 9:
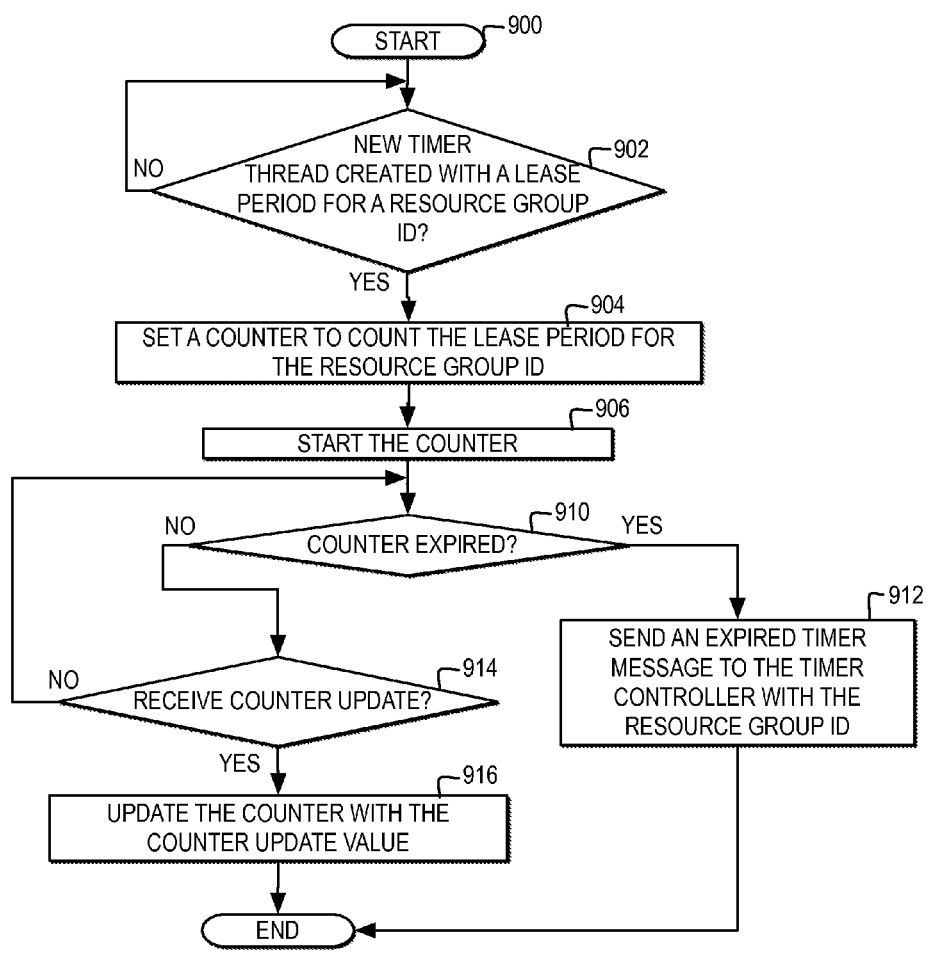
FIG. 9 illustrates a high level logic flowchart of a process and program for controlling a timer thread counting a lease period remaining for CUoD resources allocated on fallover of an application in a HA computing environment.
Figure 10:
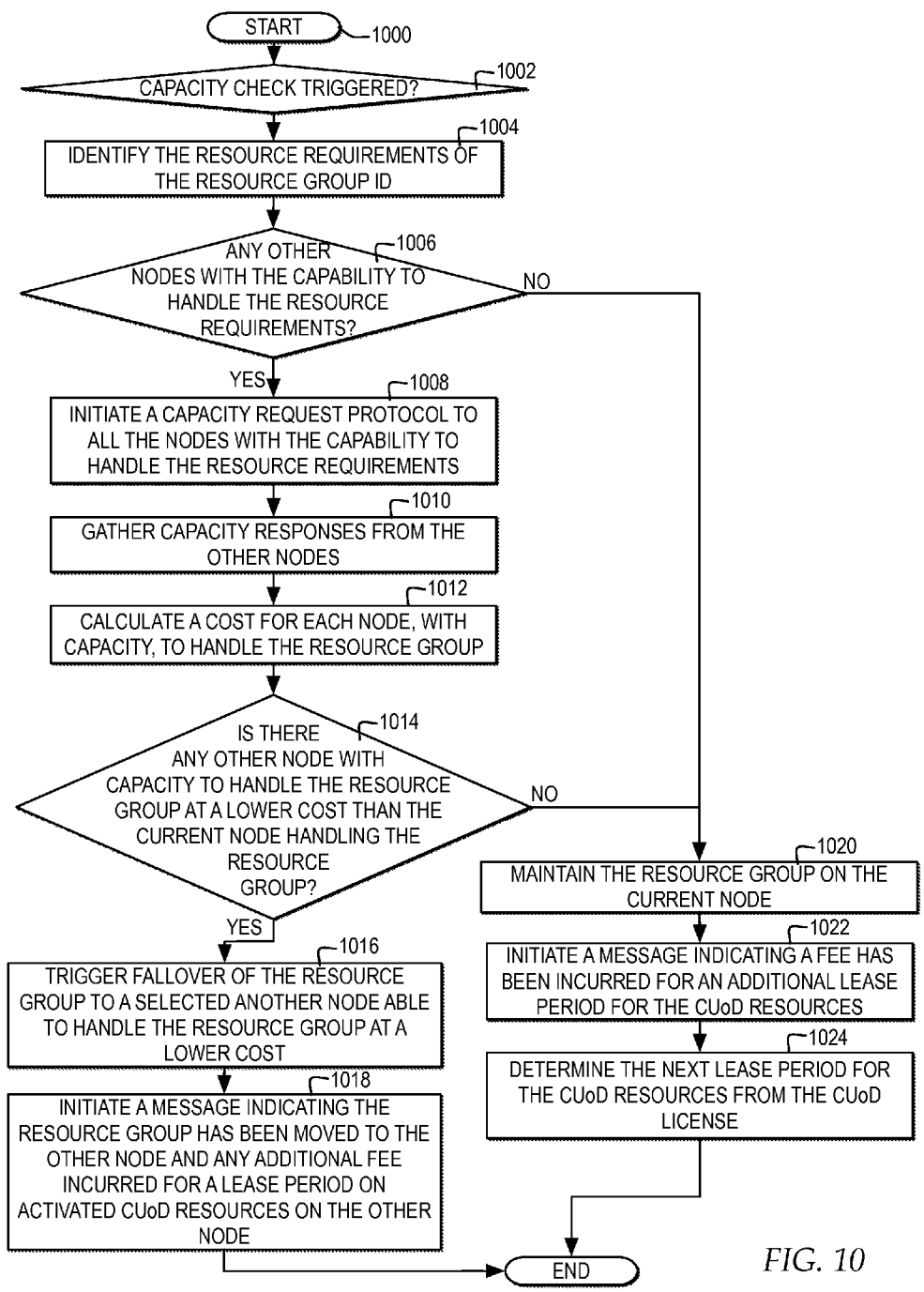
FIG. 10 illustrates a high level logic flowchart of a process and program for a fallover controller checking a capacity of other nodes to handle a resource group and deciding whether to fallover the resource group to another node.

In one embodiment, the operations performed by processor 712 may control the operations of flowchart of FIGS. 8, 9, and 10 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server. In the latter scenario, the remote computer may be connected to the user's computer through any type of network, such as network 702, through a communication interface, such as network interface 532, over a network link that may be connected, for example, to network 702.

In the example, network interface 732 includes an adapter 734 for connecting computer system 700 to network 702 through a link. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 702, and network 702 may use electrical, electromagnetic, or optical signals that carry digital data streams. The signals through the various networks and the signals on network 702, the network link to network 702, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O)

interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and program for monitoring use of CUoD resources on fallover of a resource group for an application workload in a HA computing environment. In the example, the process starts at block 800 and thereafter proceeds to block 802. Block 802 illustrates a determination by a fallover controller whether a resource group fallover requires a CUoD resource allocation for the resource group. In the example, if a resource group fallover requires a CUoD resource allocation for the resource group, then the process passes to block 804. Block 804 illustrates recording the resource ID for the CUoD resources associated with the resource group ID. Next, block 806 illustrates calculating an adjusted CUoD lease period by reducing the CUoD lease period by a reporting period. Thereafter, block 808 illustrates triggering a CUoD timer thread with the adjusted CUoD lease period and the resource group ID. Next, block 810 illustrates recording the timer thread ID in associated with the resource group ID. Thereafter, block 812 illustrates monitoring the status of the resource group ID, and the process passes to block 814.

Block 814 illustrates a determination of whether the CUoD resources have been released by the resource group. If the CUoD resources have been released by the resource group, then the process passes to block 822. If the CUoD resources have not been released by the resource group, then the process passes to block 816.

Block 816 illustrates a determination whether the fallover controller receives an expired timer message for the resource group ID. If the fallover controller does not receive an expired timer message for the resource group ID, then the process passes to block 824. Block 824 illustrates a determination whether a CUoD lease time is updated. At block 824, if a CUoD lease time is not updated, then the process passes to block 814. At block 824, if a CUoD lease time is updated, then the process passes to block 826. Block 826 illustrates sending an adjusted, updated lease time to the timer thread ID for the resource group ID, and the process passes to block 806.

Returning to block 816, if the fallover controller does receive an expired timer message for the resource group ID, then the process passes to block 818. Block 818 illustrates triggering a capacity check. Next, block 820 illustrates a determination whether the fallover controller maintains the resource group on the node. If the fallover controller maintains the resource group on the node, then the process returns to block 806. If the fallover controller does not maintain the resource group on the node, then the process passes to block 822.

FIG. 9 illustrates a high level logic flowchart of a process and program for controlling a timer thread counting a lease period remaining for CUoD resources allocated on fallover of an application in a HA computing environment. In the example, the process starts at block 900 and thereafter proceeds to block 902. Block 902 illustrates a determination whether a new timer thread is created with a lease period for a resource group ID. If a new timer thread is created, the process passes to block 904. Block 904 illustrates setting a counter to count the lease period for the resource group ID. Next, block 906 illustrates starting the counter. Thereafter, block 910 illustrates a determination whether the counter is expired. At block 910, if the counter expires, then the process passes to block 912. Block 912 illustrates sending an expired timer message to the timer controller with the resource group ID, and the process ends. Returning to block 910, if the counter has not expired, then the process passes to block 914. Block 914 illustrates a determination whether a counter update is received. If a counter update is received, then the process passes to block 916. Block 916 illustrates updating the counter with the counter update value, and the process ends.

FIG. 10 illustrates a high level logic flowchart of a process and program for a fallover controller checking a capacity of other nodes to handle a resource group and deciding whether to fallover the resource group to another node. In the example, the process starts at block 1000 and thereafter proceeds to block 1002. Block 1002 illustrates a determination whether a capacity check is triggered. If a capacity check is triggered, then the process passes to block 1004. Block 1004 illustrates identifying the resource requirements of the resource group triggering the capacity check, and the process passes to block 1006.

Block 1006 illustrates a determination whether any other nodes have the capability to handle the resource requirements for the resource group. At block 1006, if no other nodes have the capability to handle the resource requirements for the resource group, then the process passes to block 1020. Block 1020 illustrates maintaining the resource group on the current node. Next, block 1022 illustrates initiating a message indicating a fee has been incurred for an additional lease period for the CUoD resources. Thereafter, block 1024 illustrates determining the next lease period for the CUoD resources from the CUoD license, and the process ends.

Returning to block 1006, if other nodes have the capability to handle the resource requirements for the resource group, then the process passes to block 1008. Block 1008 illustrates initiating a capacity request protocol to all the nodes with the capability to handle the resource requirements. Next, block 1010 illustrates gathering capacity responses from the other nodes. Thereafter, block 1012 illustrates calculating a cost for each node, with capacity, to handle the resource group, and the process passes to block 1014.

Block 1014 illustrates a determination whether there is any other node with the capacity to handle the resource group at a lower cost than the current node handling the resource group, including the expired CUoD resources. At block 1014, if there is not another node with the capacity to handle the resource group at a lower cost, then the process passes to block 1020. At block 1014, if there is another node with the capacity to handle the resource group at a lower cost, then the process passes to block 1016. Block 1016 illustrates trigger a fallover of the resource group to a selected another node able to handle the resource group at a lower cost. Next, block 1018 illustrates initiating a message indicating the resource group has been moved to the other node and any additional fee incurred for a lease period on activated CUoD resources on the other node, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system for managing resources, the computer system comprising:
   a cluster manager, coupled to at least one processor and memory, for a particular node from among a plurality of nodes communicatively connected through a network;
   the cluster manager programmed to:
   responsive to the cluster manager allocating at least one leased resource for a resource group for an application workload on the particular node on failover of the resource group from another node from among the plurality of nodes to the particular node, set a timer thread to track an amount of time remaining for an initial lease period of the at least one leased resource; and
   responsive to the timer thread expiring while the resource group is holding the at least one leased resource, maintain the resource group comprising the at least one leased resource for an additional lease period and automatically incur an additional fee for use of the at least one leased resource by the particular node only if the particular node has the capacity to handle the resource group at a lowest cost from among the plurality of nodes.

2. The computer system according to claim 1, the cluster manager further programmed to:
   activate the at least one leased resource from an inactive resource to an active resource by acquiring a license for the at least one leased resource, wherein the cluster manager is only enabled to allocate the at least one leased resource as an active resource, wherein the license for the at least one leased resource specifies an initial fee for the initial lease period and the additional fee for the additional lease period, wherein the license for the at least one leased resource comprises an agreement to pay the additional fee for the additional lease period if the at least one leased resource is still held by the resource group at the expiration of the initial lease period; and
   allocate the at least one leased resource to the resource group, wherein the resource group holds the at least one leased resource in the resource group until at least one of the application workload has completed or the resource group is moved to an available node from among the plurality of nodes.

3. The computer system according to claim 1, the cluster manager further programmed to:
   receive a message indicating an error on the another node;
   decide to trigger a failover of the resource group from the another node to the particular node; and
   manage failover of the resource group from the another node to the particular node by allocating a required minimum selection of resources to the resource group, where the required minimum selection of resources comprises the at least one leased resource, and restarting the application workload on the allocated required minimum selection of resources of the resource group.

4. The computer system according to claim 1, the cluster manager further programmed to:
   detect an insufficient number of resources available for allocation for the resource group on the particular node, wherein the resources available for allocation do not comprise the at least one leased resource;
   acquire a license for leasing the at least one leased resource, in exchange for a fee, wherein the license requires that if the at least one leased resource is not released prior to the end of the first lease period then an additional fee is automatically incurred for the additional lease period; and
   activate the at least one leased resource from an inactive state to an active state using the license.

5. The computer system according to claim 1, the cluster manager further programmed to:
   communicatively connect with a plurality of other cluster managers on the other nodes from among the plurality of nodes, wherein the plurality of nodes share at least one storage resource.

6. The computer system according to claim 1, the cluster manager further programmed to:
   responsive to setting the timer thread, monitor whether the resource group releases the at least one leased resource; and responsive to detecting the resource group releasing the at least one leased resource, cancel the timer thread.

7. The computer system according to claim 1, the cluster manager further programmed to:
   detect the timer thread expiring while the resource group is holding the at least one leased resource;
   determine whether there is a selection of at least one other node from among the plurality of nodes with capability to handle one or more resource group requirements for the resource group;
   responsive to detecting no selection of at least one other node with capability to handle the resource group requirements, maintain the resource group on the particular node comprising the at least one leased resource for the additional lease period;
   responsive to detecting the selection of the at least one other node with capability to handle the resource group requirements, send a capacity request to a separate cluster manager on each of the selection of the at least one other node;
   receive a separate capacity response to each capacity request from each separate cluster manager, wherein each separate capacity response comprises a separate current capacity from one of the selection of the at least other node of the resources available for allocation;
   calculate a particular cost associated with the particular node continuing to handle the resource group and a separate cost associated with the selection of the at least one other node handling the resource group with each separate current capacity;
   responsive to the cluster manager calculating the particular cost is the lowest cost from among the particular cost and each separate cost, maintain the resource group on the particular node comprising the at least one leased resource for the additional lease period; and
   responsive to the cluster manager calculating another cost from among each separate cost is the lowest cost from among the particular cost and each separate cost, trigger failover of the resource group from the particular node to a next node associated with the another cost from among the selection of the at least one other node and deactivating the at least one leased resource.

8. The computer system according to claim 1, the cluster manager further programmed to:
   responsive to maintaining the resource group on the particular node comprising the at least one leased resource for the additional lease period, trigger a message to a client interface indicating the lease of the at least one leased resource has been automatically extended for the additional lease period for the additional fee.

9. A computer program product for managing resources, the computer program product comprising a non-transitory computer readable storage medium having program instructions embodied therewith, the program instructions executable by a computer to cause the computer to:
   responsive to a cluster manager, for a particular node from among a plurality of nodes communicatively connected through a network, allocating at least one leased resource for a resource group for an application workload on the particular node on fallover of the resource group from another node from among the plurality of nodes to the particular node, set a timer thread to track an amount of time remaining for an initial lease period of the at least one leased resource; and
   responsive to the timer thread expiring while the resource group is holding the at least one leased resource, maintain the resource group comprising the at least one leased resource for an additional lease period and automatically incur, by the cluster manager for the particular node, an additional fee, only if the particular node has the capacity to handle the resource group at a lowest cost from among the plurality of nodes.

10. The computer program product according to claim 9, further comprising the program instructions executable by a processor to cause the processor to:
    activate the at least one leased resource from an inactive resource to an active resource by acquiring a license for the at least one leased resource, wherein the cluster manager is only enabled to allocate the at least one leased resource as an active resource, wherein the license for the at least one leased resource specifies an initial fee for the initial lease period and the additional fee for the additional lease period, wherein the license for the at least one leased resource comprises an agreement to pay the additional fee for the additional lease period if the at least one leased resource is still held by the resource group at the expiration of the initial lease period; and
    allocate the at least one leased resource to the resource group, wherein the resource group holds the at least one leased resource in the resource group until at least one of the application workload has completed or the resource group is moved to an available node from among the plurality of nodes.

11. The computer program product according to claim 9, further comprising the program instructions executable by a processor to cause the processor to:
    receive a message indicating an error on the another node;
    decide to trigger a fallover of the resource group from the another node to the particular node; and
    manage fallover of the resource group from the another node to the particular node by allocating a required minimum selection of resources to the resource group, where the required minimum selection of resources comprises the at least one leased resource, and restarting the application workload on the allocated required minimum selection of resources of the resource group.

12. The computer program product according to claim 9, further comprising the program instructions executable by a processor to cause the processor to:
    detect an insufficient number of resources available for allocation for the resource group on the particular node, wherein the resources available for allocation do not comprise the at least one leased resource;
    acquire a license for leasing the at least one leased resource, in exchange for a fee, wherein the license requires that if the at least one leased resource is not released prior to the end of the first lease period then an additional fee is automatically incurred for the additional lease period; and
    activate the at least one leased resource from an inactive state to an active state using the license.

* * * * *